Sept. 21, 1965  J. HUBER  3,207,438
REGULATING VALVE FOR MANUAL AND AUTOMATIC ACTUATION
Filed Sept. 25, 1963
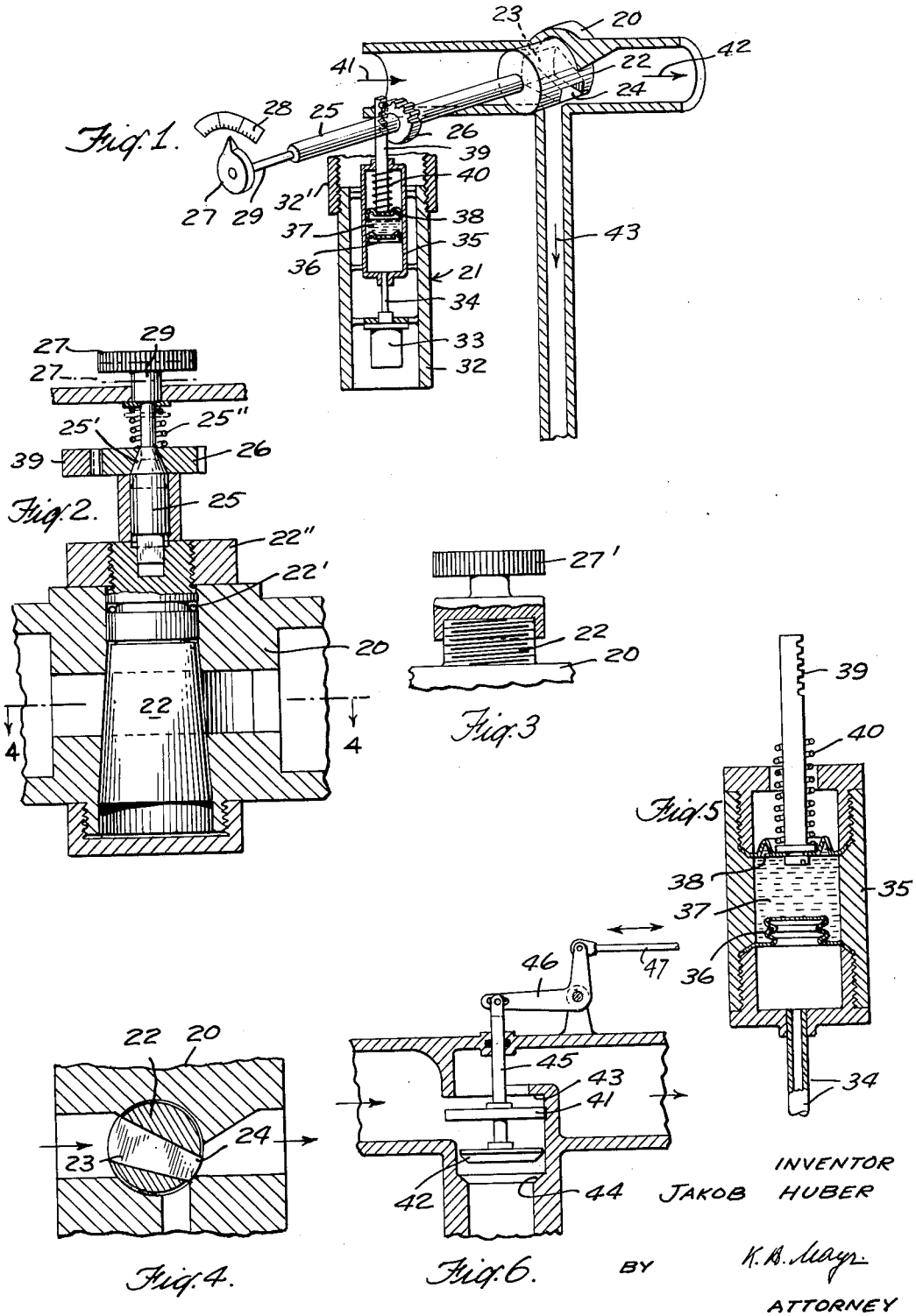
INVENTOR
JAKOB HUBER
BY K. B. Mayr
ATTORNEY United States Patent Office 3,207,438
Patented Sept. 21, 1965

3,207,438
REGULATING VALVE FOR MANUAL AND
AUTOMATIC ACTUATION
Jakob Huber, Wurenlos, Switzerland, assignor to J. Huber & Cie. A.G., Wurenlos, Switzerland, a corporation of Switzerland
Filed Sept. 25, 1963, Ser. No. 311,356
Claims priority, application Switzerland, Oct. 6, 1962, 11,706/62
4 Claims. (Cl. 236—98)

The present invention relates to regulating valves suitable for manual as well as for automatic operation.

The valves according to the invention are particularly suitable for by-passing a heating fluid around a radiator of a central heating system whereby, upon fully or partly stopping the flow of heating fluid through the radiator, the rate of flow of heating fluid circulating in the system from a heater through radiators and back to the heater is substantially unaffected.

An object of the invention is the provision of a regulating valve which operates substantially without friction and requires a minimum of actuating force.

A further object of the invention is the provision of a valve which can be selectively actuated by hand or automatically in response to pressure or temperature.

An object of the invention is the provision of a valve comprising means for manual operation and means for automatically operating the valve whereby the last mentioned means form a self-contained unit which can be conveniently mounted on and removed from the valve.

Another object of the invention resides in the provision of a valve for dividing a stream of fluid into two streams and controlling the relative rates of flow of the two streams, the valve according to the invention permitting flow of fluid at any position of the valve and including means for tightening the valve to stop flow of fluid in one of the streams.

An object of the invention is the provision of an automatic for automatically actuating a valve, the automatic comprising a temperature or pressure responsive means producing pressure in a fluid which pressure acts on a piston-like means whose movements are transmitted to the valve for actuating the latter. The means for transmitting the movements of the piston-like means to the valve preferably include a clutch for disconnecting the valve from the piston-like means, when manual operation of the valve is desired.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 1 is a schematic, partly perspective and sectional illustration of a valve according to the invention.

FIG. 2 is a large scale longitudinal sectional view of the valve shown in FIG. 1.

FIG. 3 is a part-sectional view of a device for adapting the valve shown in FIGS. 1 and 2 to manual operation.

FIG. 4 is a diagrammatic cross-sectional view of the valve shown in FIG. 2, the section being made along line 4—4 of FIG. 2.

FIG. 5 is a longitudinal sectional view of a pressure responsive device forming part of an automatic according to the invention.

FIG. 6 is a diagrammatic sectional view of a modified valve.

Referring more particularly to FIGURES 1 to 5 of the drawing wherein like parts are designated by like numerals, a rotary slide valve 22 is arranged in a valve housing 20. The latter is so constructed that an automatic 21 can be mounted thereon.

The rotary slide valve 22 has a rectangular inlet opening 23 and a rectangular, though much smaller, outlet opening 24. The valve 22 is connected to a shaft 25 having a conical portion 25' (FIG. 2). A pinion 26 having a corresponding conical bore is axially slidable on the shaft 25. A spring 25'' presses the pinion into engagement with the conical shaft portion 25'. A knob 27 for manual operation is connected by a shaft 29 to the shaft 25. The knob 27 is preferably provided with a pointer to indicate the angular position of the knob on a scale 28.

The automatic 21 is provided with a protecting tube 32 containing a vessel 33 whose interior is connected to a cylinder 35 by means of a capillary tube 34. Two plate-like elements 36 and 38 are placed in axially spaced relation in the cylinder 35. The space between these elements is filled with a liquid. A low temperature boiling liquid, for example, Freon, is contained in the vessel 33, in the capillary tube 34 and in the portion of the cylinder 35 below the element 36. The liquid in the space between the elements 36 and 38 may be glycerin or a liquid which is preferably chemically indifferent to the aforesaid low temperature boiling fluid. The elements 36 and 38 and the liquid 37 therebetween form a pistonlike structure, a piston rod 39 being connected to the upper element 38 and provided at its upper end with a rack engaging with the pinion 26. The pistonlike structure 36–38 is downwardly urged by a spring 40. The elements 36, 38 may be in the form of diaphragms or membranes whose marginal portions are secured to the inside of the cylinder 35 as shown in FIG. 5.

The conical valve 22 is sealed against the outside by a sealing ring 22' of circular cross section. Since, during normal operation, a complete closure of the valve 22 is not necessary, a small clearance is provided between the valve and the housing 20, facilitating rotation of the valve. If desired, the valve 22 can be tightened against the housing by axially pulling it onto the housing by manipulation of a nut 22'' (FIG. 2).

The tube 32 containing the automatic is preferably screwed into a suitable socket 32' of the valve housing 20. If manual operation of the valve 22 is desired, the tube 32 with the parts contained therein may be removed and the socket be closed by a suitable plug.

When the apparatus is in operation the fluid enters the valve 22 in the direction of the arrow 41 and flows from the valve in the direction of the arrow 42 and/or in the direction of the arrow 43.

If the valve is actuated by hand the knob 27 is pressed for axially moving the shafts 29, 25 and the conical portion 25' of the latter out of engagement with the pinion 26 against the action of the spring 25'' so that the valve 22 can be rotated independently of the automatic. With this operation initial adjustment and readjustment of the device can be effected. To permit the slight axial movement of the shaft 25 for disengaging the pinion from the shaft, the end of the shaft 25 adjacent to the valve 22 is provided with a square axially slidably fitting into a square hole in the valve.

When the automatic is in operation a quantity of the liquid in the vessel or container 33 evaporates, depending on the temperature of the container, and the pressure in the tube 34 and in the space in the cylinder 35 below the membrane or diaphragm 36 rises with rising temperature and conversely. Rising pressure urges the piston rod upward against the action of the spring 40. This causes rotation of the pinion 26. Dropping temperature and dropping pressure in the space below the diaphragm 36 causes rotation of the pinion 26 and of the valve 22 in the opposite direction. In this way the valve 22 is so operated that, for example, a suitable amount of heating fluid flows into the radiator of a central heating system to maintain a desired room temperature. The position of the valve is indicated on the scale 28.

The regulating valve according to the invention has the great advantage that the automatic 21 can be easily disconnected from the valve housing 20. By removing the parts 22" and 25 to 27 and screwing a knob 27' (FIG. 3) onto the valve 22 the latter can be manually operated.

The invention is not limited to rotary valves. An axially movable valve, as shown in FIG. 6 may be used. The valve comprises two valve elements 41 and 42 and two seats 43 and 44. The valves are on a common stem 45 which is reciprocatingly actuated by an angle lever 46. The latter is connected by a link 47 to the piston rod 39 of the automatic. Provision may be made for disconnecting the link 47 from the rod 39 and manual actuation of the link 47.

The container 33 is preferably easily replaceably connected to the tube 34 or to the cylinder 35. If leakage occurs the automatic cannot operate correctly or cannot operate at all. It is therefore proposed to use sealed cartridges as containers 33 which cartridges are filled with a thermostatic fluid and which have heads which are punctured when the cartridge is connected to the tube 34. Such cartridges are conventional and are therefore not illustrated in detail.

In lieu of a vaporizable liquid, a liquid having a great temperature expansion coefficient may be contained in the vessel 33, in the capillary tube 34 and in the space in the cyinder 35 below the diaphragm 36. A rod having a great temperature expansion coefficient or a bimetallic thermostat element may be used for actuating the rod 39 without departing from the scope of the present invention. The regulating valves according to the invention require only a very small actuating force and the automatic according to the invention is capable to operate between close temperature limits. During normal operation the regulating valves do not act as shutoff valves and are surrounded by the controlled fluid and operate with very little friction.

The invention is not only applicable to three-way valves, as shown, but can equally well be applied to two-way valves.

I claim:

1. A regulating valve, particularly for central heating systems, for selective manual and automatic operation, comprising:
   a valve housing,
   a conical chamber in said housing,
   a temperature-responsive device placed outside of said housing, connected to said housing, and including a rack longitudinally movable at changing temperature,
   a conical valve rotatable in said chamber,
   shaft means axially movably connected to said valve and coaxial therewith for rotating said valve, said shaft means extending outside of said housing, and
   a pinion permanently engaging said rack,
   said axially movable shaft means coaxially extending through said pinion and including means for selectively connecting said pinion to said shaft means for rotating said shaft means and said valve when the pinion is rotated by said rack, and disengaging said shaft means from said pinion for freely rotating said pinion by said rack.

2. A regulating valve as defined in claim 1 wherein said temperature-responsive device forms a self-contained unit which is removably connected to said housing.

3. A regulating wave as defined in claim 1 wherein said means for connecting said pinion to said shaft means and for disengaging said shaft means from said pinion includes a conical portion coaxial of said shaft means, said pinion having a conical bore corresponding to said conical portion and frictionally engaging the latter when said shaft means is axially moved for connecting said pinion to said shaft means for rotating said shaft means and said valve by said pinion, said conical portion being axially displaced from said conical bore when said shaft means is moved in the opposite direction for free rotation of said pinion.

4. A regulating valve as defined in claim 1 wherein said conical valve is axially movable in said housing for selectively providing a clearance all around said valve when said valve is in normal operation and effecting frictional engagement of said valve with said housing and impeding rotation of said valve when said valve is axially moved, said valve having an externally threaded portion coaxial of said valve and extending outside of said housing, a nut member being screwed on said threaded portion and abutting against said housing for axially moving said valve when said nut member is rotated.

References Cited by the Examiner

UNITED STATES PATENTS

| | | | |
|---|---|---|---|
| 275,571 | 4/83 | Block. | |
| 654,009 | 7/00 | Kittinger et al. | 251—250 X |
| 1,000,435 | 8/11 | Pagelsen | 236—34.5 |
| 1,632,125 | 6/27 | French et al. | |
| 1,834,344 | 12/31 | Merritt | 251—250 X |
| 2,023,349 | 12/35 | Whittle et al. | 251—312 |
| 2,376,683 | 5/45 | Gill | 236—34.5 X |
| 2,425,000 | 8/47 | Paget. | |
| 2,491,576 | 12/49 | Oaks | 237—8 |
| 2,810,523 | 10/57 | Branson | 236—12 |
| 3,067,944 | 12/62 | Meier | 236—99 X |

FOREIGN PATENTS

| | | |
|---|---|---|
| 594,608 | 6/23 | France. |
| 153,974 | 4/56 | Sweden. |

EDWARD J. MICHAEL, *Primary Examiner.*

ALDEN D. STEWART, *Examiner.*